United States Patent
Puthillathe et al.

(10) Patent No.: US 9,612,846 B2
(45) Date of Patent: Apr. 4, 2017

(54) OUT-OF-BAND (OOB) REAL-TIME INVENTORY AND CONFIGURATION OF ORIGINAL EQUIPMENT MANUFACTURER (OEM) DEVICES USING ADVANCED CONFIGURATION AND POWER INTERFACE (ACPI) AND UNIFIED EXTENSIBLE FIRMWARE INTERFACE (UEFI) SERVICES

(71) Applicant: Dell Products, L.P., Round Rock, TX (US)

(72) Inventors: Chandrasekhar Puthillathe, Bangalore (IN); Sumanth Vidyadhara, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 30 days.

(21) Appl. No.: 14/735,190

(22) Filed: Jun. 10, 2015

(65) Prior Publication Data

US 2016/0364243 A1 Dec. 15, 2016

(51) Int. Cl.
*G06F 9/00* (2006.01)
*G06F 9/44* (2006.01)

(52) U.S. Cl.
CPC .......... *G06F 9/4406* (2013.01); *G06F 9/4411* (2013.01)

(58) Field of Classification Search
CPC .............................. G06F 9/4406; G06F 9/4411
USPC .......... 713/1, 320, 2; 711/141; 710/312; 1/1; 717/168
See application file for complete search history.

(56) References Cited

U.S. PATENT DOCUMENTS

| | | | |
|---|---|---|---|
| 6,167,512 A | 12/2000 | Tran | |
| 6,176,511 B1* | 1/2001 | Adkisson | B60R 21/2171 280/728.2 |
| 7,007,160 B1* | 2/2006 | Makphaibulchoke | G06F 9/4411 713/1 |
| 7,502,803 B2* | 3/2009 | Culter | G06F 9/4411 |
| 2002/0059473 A1* | 5/2002 | Oshins | G06F 9/4411 719/321 |
| 2002/0133487 A1* | 9/2002 | Oshins | G06F 9/4411 |
| 2003/0135785 A1* | 7/2003 | Carr | G06F 11/2289 714/25 |

(Continued)

*Primary Examiner* — Aurel Prifti
(74) *Attorney, Agent, or Firm* — Fogarty LLP (57) ABSTRACT

Systems and methods for providing Out-of-Band (OOB) real-time inventory and configuration of Original Equipment Manufacturer (OEM) devices using Advanced Configuration and Power Interface (ACPI) and Unified Extensible Firmware Interface (UEFI) services. In an embodiment, a method may include, during the booting of an Operating System (OS) and under control of an UEFI firmware, creating an OEM runtime-defined table configured to store a list of Globally Unique Identifiers (GUIDs) associated with OEM devices, where each OEM device corresponds to an OEM vendor-owned UEFI real-time service, and where each OEM vendor-owned UEFI real-time service is configured to enable operations after the booting of the OS; and load an ACPI OEM driver configured to interpret the OEM runtime-defined table and to invoke one or more corresponding OEM vendor-owned UEFI runtime services, and inform a Baseboard Management Controller (BMC) coupled to the processor that the ACPI OEM driver is available.

20 Claims, 2 Drawing Sheets

(56) References Cited

U.S. PATENT DOCUMENTS

| | | | | |
|---|---|---|---|---|
| 2006/0248282 | A1* | 11/2006 | Rostampour | G06F 9/45537 711/141 |
| 2007/0162776 | A1* | 7/2007 | Carpenter | G06F 1/3203 713/320 |
| 2008/0072028 | A1* | 3/2008 | Allison | G06F 9/4418 713/1 |
| 2009/0138865 | A1* | 5/2009 | Furbee | G06F 8/67 717/168 |
| 2011/0276794 | A1* | 11/2011 | Yamaguchi | G06F 9/4413 713/1 |
| 2013/0318336 | A1* | 11/2013 | Yu | G06F 9/4406 713/2 |
| 2014/0089551 | A1* | 3/2014 | Estrada | G06F 9/4411 710/312 |
| 2014/0297999 | A1* | 10/2014 | Kim | G06F 9/4401 713/1 |
| 2015/0100801 | A1* | 4/2015 | Maity | G06F 1/3206 713/320 |
| 2015/0160960 | A1* | 6/2015 | Delco | G06F 9/45545 718/1 |
| 2016/0306649 | A1* | 10/2016 | Gunti | G06F 9/45558 |

\* cited by examiner

OUT-OF-BAND (OOB) REAL-TIME INVENTORY AND CONFIGURATION OF ORIGINAL EQUIPMENT MANUFACTURER (OEM) DEVICES USING ADVANCED CONFIGURATION AND POWER INTERFACE (ACPI) AND UNIFIED EXTENSIBLE FIRMWARE INTERFACE (UEFI) SERVICES

FIELD

This disclosure relates generally to computer systems, and more specifically, to systems and methods for providing Out-of-Band (OOB) real-time inventory and configuration of Original Equipment Manufacturer (OEM) devices using Advanced Configuration and Power Interface (ACPI) and Unified Extensible Firmware Interface (UEFI) services.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and/or networking systems.

The inventors hereof have recognized that it would be beneficial for Original Equipment Manufacturers (OEMs) to be able to receive and provide management support for off-the-shelf peripherals that are installed within an IHS prior to shipping (e.g., by the IHS manufacturer) and/or at a later time (e.g., by the end user). Unfortunately, in the case of Peripheral Component Interconnect Express (PCIe) devices, for example, real-time management is currently achieved via the Inter-Integrated Circuit (i²C) bus. More generally, available Out-of-Band (OOB) management of peripheral devices is restricted to approved devices only, and various devices do have support for real-time capabilities.

Previous attempts to provide real-time OOB management of peripheral devices require Operating System (OS)-based OEM software agents, hardware modifications, or both. Accordingly, to address these, and other problems, the inventors hereof have developed systems and methods for providing OOB real-time inventory and configuration of OEM devices using Advanced Configuration and Power Interface (ACPI) and Unified Extensible Firmware Interface (UEFI) services.

SUMMARY

Embodiments of systems and methods for providing Out-of-Band (OOB) real-time inventory and configuration of Original Equipment Manufacturer (OEM) devices using Advanced Configuration and Power Interface (ACPI) and Unified Extensible Firmware Interface (UEFI) services are described herein. In an illustrative, non-limiting embodiment, a method may include (a) during the booting of an Operating System (OS) and under control of an UEFI firmware: creating an OEM runtime-defined table configured to store a list of Globally Unique Identifiers (GUIDs) associated with OEM devices coupled to an Information Handling System (IHS), where each OEM device corresponds to an OEM vendor-owned UEFI real-time service, and where each OEM vendor-owned UEFI real-time service is configured to enable operations with respect to a corresponding one of the OEM devices after the booting of the OS; and loading an ACPI OEM driver configured to interpret the OEM runtime-defined table and to invoke one or more corresponding OEM vendor-owned UEFI runtime services, and inform a Baseboard Management Controller (BMC) coupled to the processor that the ACPI OEM driver is available; and (b) after the booting of the OS, using contents of the OEM runtime-defined table to perform, via the BMC, at least one of the operations upon at least one of the OEM devices.

In various embodiments, the OEM devices may not be real-time Configuration Enablement Management (CEM) capable. The method may include populate the OEM runtime-defined table under control of the BMC. The method may also include generating, in response to the BMC's completion of the population operation, an ACPI General Processing Event (GPE) configured to inform the ACPI OEM driver that an ACPI event has occurred. For example, the ACPI GPE may be a System Control Interrupt (SCI). And the method may further include reading, by the OS in response to receiving the SCI, each given GUID in the OEM runtime-defined table and invoke corresponding vendor-owned UEFI real-time services; and clearing a list of active GUIDs in preparation for a subsequent set of operations.

In some cases, the operations may include an OEM device inventory operation. In other cases, the operations may include an OEM device management operation.

The method may include, prior to the booting of the OS and under control of the UEFI, making one or more ACPI tables available to the OS. Additionally or alternatively, the method may include, during the booting of the OS and under control of the OS, initializing the one or more ACPI tables using a Root System Description Pointer (RSPD) supplied by the UEFI. For instance, initializing the one or more ACPI tables may include adding definition blocks in a platform vendor namespace.

Moreover, in some implementations, the method may include gathering OEM device inventory information after booting of the OS and share the OEM device inventory information with the BMC in a pre-defined operating region.

In other illustrative, non-limiting embodiments, the techniques outlined herein may be performed by an IHS having a processor and a memory coupled to the processor, the memory including program instructions stored thereon that, upon execution by the processor, cause the IHS to execute one or more operations. In yet other embodiments, a memory device or non-transitory computer-readable medium may have program instructions stored thereon that, upon execution by an IHS, cause the IHS to execute one or more of the techniques described herein.

BRIEF DESCRIPTION OF THE DRAWINGS

The present invention(s) is/are illustrated by way of example and is/are not limited by the accompanying figures.

DETAILED DESCRIPTION

Systems and methods for providing Out-of-Band (OOB) real-time inventory and configuration of Original Equipment Manufacturer (OEM) devices using Advanced Configuration and Power Interface (ACPI) and Unified Extensible Firmware Interface (UEFI) services are described.

As used herein, the term "OOB" includes out-of-band data and/or signals communicated via a bus or channel that is independent from a main, in-band bus or channel.

As such, an OOB mechanism may be configured to provide a conceptually independent communication channel, which allows any data and/or signals sent via that OOB mechanism to be kept and processed separately from in-band data and/or signals.

The term "OEM," as used herein, refers to any vendor or entity that makes a device or component that is used in another entity's end-product. For example, in various cases, a manufacturer's Information Handling System (IHS) may include a number of peripheral devices or other components coupled thereto, and those peripheral devices or other components may have been made by another manufacturer. In such cases, the peripheral devices or other components are referred to as OEM devices, the other manufacturer is referred to as an OEM, and the IHS is referred to as the end-product.

In the following detailed description of embodiments of the disclosure, specific embodiments in which the disclosure may be practiced are described in sufficient detail a person of ordinary skill in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, component, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
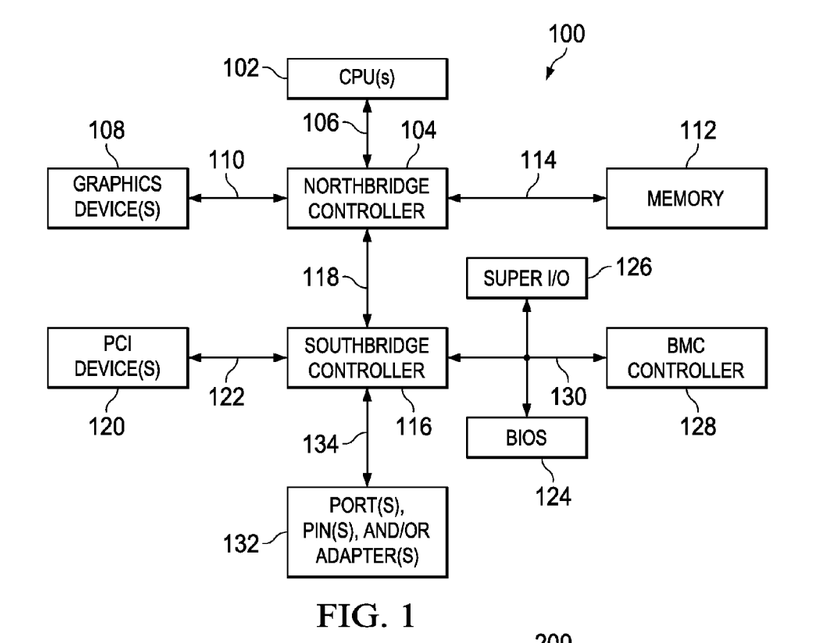
FIG. 1 is a block diagram illustrating an example of an Information Handling System (IHS) configured to provide Out-of-Band (OOB) real-time inventory and configuration of Original Equipment Manufacturer (OEM) devices using Advanced Configuration and Power Interface (ACPI) and Unified Extensible Firmware Interface (UEFI) services according to some embodiments.

FIG. 1 is a block diagram illustrating an example of an IHS configured to provide OOB real-time inventory and configuration of OEM devices using ACPI and UEFI services according to some embodiments. As shown, IHS 100 includes one or more CPUs 102. In various embodiments, IHS 100 may be a single-processor system including one CPU 102, or a multi-processor system including two or more CPUs 102 (e.g., two, four, eight, or any other suitable number). CPU(s) 102 may include any processor capable of executing program instructions. For example, in various embodiments, CPU(s) 102 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA. In an embodiment, a motherboard configured to provide structural support, power, and electrical connectivity between the various aforementioned components. Such a motherboard may include multiple connector sockets in various configurations, adapted to receive pluggable circuit cards, component chip packages, etc.

CPU(s) 102 are coupled to northbridge controller or chipset 104 via front-side bus 106. Northbridge controller 104 may be configured to coordinate I/O traffic between CPU(s) 102 and other components. For example, in this particular implementation, northbridge controller 104 is coupled to graphics device(s) 108 (e.g., one or more video cards, controllers, or adaptors, etc.) via graphics bus 110 (e.g., an Accelerated Graphics Port or AGP bus, a Peripheral Component Interconnect or PCI bus, etc.). Northbridge controller 104 is also coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 is coupled to southbridge controller or chipset 116 via internal bus 118. Generally, southbridge controller 116 may be configured to handle various of IHS 100's I/O operations, and it may provide interfaces such as, for instance, Universal Serial (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other device suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 is further coupled to one or more PCI devices 120 (e.g., network cards, sound cards, video cards, etc.) via PCI bus 132. Southbridge controller 116 is also coupled to Basic Input/Output System (BIOS) or Unified Extensible Firmware Interface (UEFI) firmware 124, Super I/O Controller 126, and Baseband Management Controller (BMC) 128 via Low Pin Count (LPC) bus 110.

BIOS/UEFI 124 includes non-volatile memory having program instructions stored thereon. Those instructions may be usable CPU(s) 102 to initialize and test other hardware components and/or to load an Operating System (OS) onto IHS 100. As such, BIOS/UEFI 124 may include a firmware interface that allows CPU(s) 102 to load and execute certain operations.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS/UEFI's interface to initialize and test components of IHS 100.

In many implementations, BIOS/UEFI 124 and/or BMC controller 128 may operate prior to the booting of the OS (e.g., in response to a power-up or reset command), and may provide a pre-boot GUI to enable interactions between the user and IHS 100 before the OS is executed. Super I/O Controller 126 combines interfaces for a variety of lower bandwidth or low data rate devices. Those devices may include, for example, floppy disks, parallel ports, keyboard and mouse, temperature sensor and fan speed monitoring, etc.

In some cases, IHS 100 may be configured to access different types of computer-accessible media separate from memory 112. Generally speaking, a computer-accessible memory device may include any tangible, non-transitory storage media or memory media such as electronic, magnetic, or optical media—e.g., magnetic disk, a hard drive, a CD/DVD-ROM, a Flash memory, etc.—coupled to IHS 100 via northbridge controller 104 and/or southbridge controller 116.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of physical storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following an Intel® architecture, various systems and methods described herein may be adapted to work with any other chipset and/or BMC configuration.

In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be enclosed within a chassis or the like.

A person of ordinary skill in the art will recognize that IHS 100 of FIG. 1 is only an example of a system in which the present embodiments may be utilized. Indeed, the present embodiments may be used in various other types of electronic devices.

Figure 2:
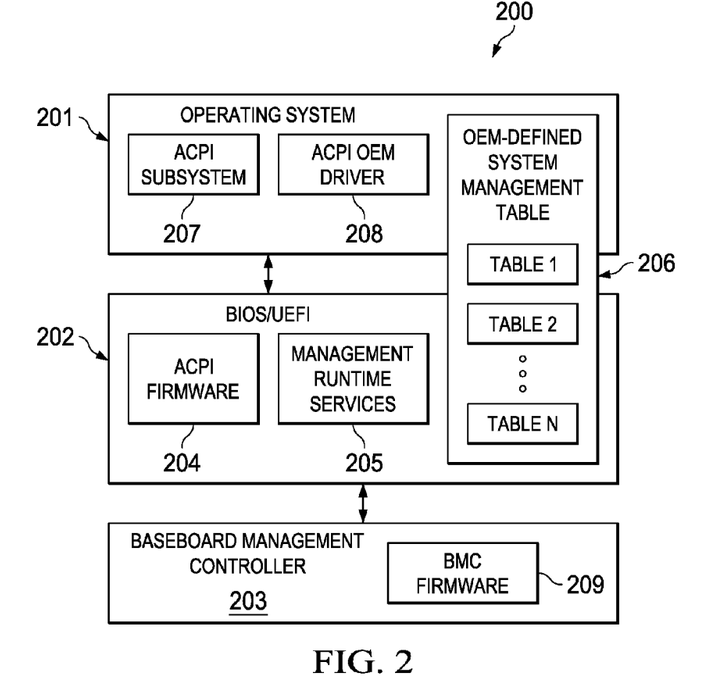
FIG. 2 illustrates an example of a services architecture according to some embodiments.

With reference now to FIG. 2, there is illustrated an example of services architecture 200 that may be implemented by IHS 100 in order to provide OOB real-time inventory and configuration of OEM devices using ACPI and UEFI services. As shown, Operating System (OS) 201 layer is executed, for example, by CPU(s) 102. BIOS/UEFI 202 includes a layer of instructions or commands provided by BIOS/UEFI chipset 124. And BMC 203 includes a layer of instructions or commands implemented by BMC controller 128.

BIOS/UEFI 202 includes ACPI firmware 204 and management runtime services 205, OS 201 includes ACPI subsystem 207 and OEM ACPI driver 208, and BMC 203 includes BCM firmware 209. OEM runtime-defined system management table(s) 206 is/are provided and/or maintained by OS 201 and/or BIOS/UEFI 202.

Layers 201-203 of architecture 200 may perform different operations at different times during execution. For example, BIOS/UEFI 202 may perform certain operations in a pre-boot environment, OS layer 201 may perform other operations during booting of the OS, and BMC 203 may perform yet other operations after booting is complete. As such, components 201-209 may cooperate with one another to provide OOB real-time inventory and configuration of OEM devices using ACPI and UEFI services, as described in more detail below.

Figure 3:
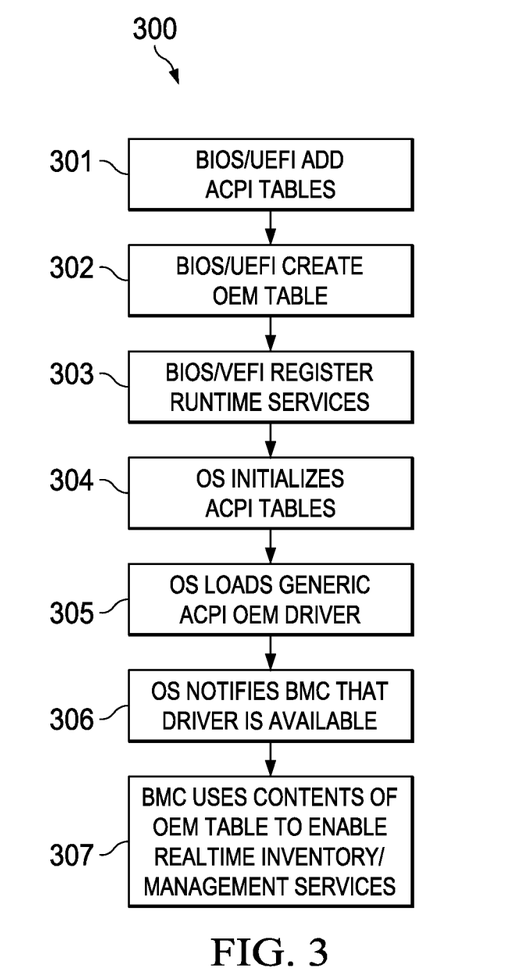
FIG. 3 is a flowchart of an example of a method for providing OOB real-time inventory and configuration of OEM devices using ACPI and UEFI services according to some embodiments.

In that regard, FIG. 3 is a flowchart of an example of method 300 for providing OOB real-time inventory and configuration of OEM devices using ACPI and UEFI services. In the discussion of FIG. 3, reference is also made to various components illustrated in FIGS. 1 and 2. In some embodiments, method 300 may be performed, at least in part, by IHS 100 and components 201-203 of services architecture 200.

In some implementations, blocks 301-306 may be executed during the booting of an OS of IHS 100. For example, blocks 301-303 may be performed "pre-OS," that is, before OS 201 is given control of IHS 100, whereas blocks 304-306 may be performed "post-OS," that is, after OS 201 is given control of IHS 100. Block 307 may be performed after the booting process is completed.

At block 301, during system boot, ACPI firmware 204 within BIOS/UEFI 202 adds ACPI tables and hands control of IHS 100 to OS 201. These ACPI tables provide an interface between an ACPI-compliant OS, such as OS 201, and system firmware by providing a description of system hardware in a platform-independent manner. Examples of APCI tables include but are not limited to, Differentiated System Description Tables (DSDTs), Secondary System Description Tables (SSDTs), and Static Resource Affinity Tables (SRATs).

At block 302, a new OEM runtime-defined systems management table 206 ("OEM table") is added by BIOS/UEFI 202. In various embodiments, OEM table 206 is configured to store a list of Globally Unique Identifiers (GUIDs) associated with OEM devices coupled to the IHS (e.g., PCIe devices, or the like), such that each OEM device corresponds to an OEM vendor-owned UEFI real-time service, and such that each OEM vendor-owned UEFI real-time service is configured to enable operations with respect to a corresponding one of the OEM devices after the booting of OS 201.

In some cases, the OEM devices may not be real-time Configuration Enablement Management (RT-CEM) capable. For example, the manufacturer of the OEM device may not have an agreement with the IHS manufacturer to include conventional drivers for those devices in its systems. Additionally or alternatively, method 300 may detect that one or more OEM devices, although CEM capable, are currently unable to perform or submit to one or more inventory and/or management operations (e.g., due to one or more errors), and therefore method 300 may add the otherwise CEM-capable OEM devices to OEM table 206.

At block 303, BIOS/UEFI 202 registers a list of runtime services that provide management capabilities via component 205. These runtime services may be invoked after OS 201 has booted. In some cases, UEFI runtime services may be modified, for example, when there is a new hardware to be supported or additional management features are desired.

At block 304, ACPI subsystem 207 in OS 201 initializes all ACPI tables using a Root System Description Pointer (RSDP) supplied by BIOS/UEFI 202 (a data structure used in the ACPI programming interface located in a platform-dependent manner that describes other ACPI tables), and manufacturer defined systems management definition blocks may also be added to a dedicated platform vendor namespace.

At block 305, depending on the type of operating system (e.g., Windows®, Linux®, OS X®, etc.), a generic ACPI vendor driver/component 208 is loaded by OS 201 (referred to as "ACPI OEM driver 208"). This ACPI component is responsible for interpreting OEM table 206 and invoking appropriate UEFI runtime services. For example, in Windows®, ACPI OEM driver 208 may be referred as a function driver and the resulting objects may be termed filter device objects. In Linux®, on the other hand, ACPI OEM driver is implemented as OEM provided scripts that are interpreted by the ACPI daemon.

At block 306, ACPI OEM driver 208 informs BMC 203 that it is ready to invoke UEFI runtime services. BMC 203 populates OEM table 206 with a list of GUIDs that correspond to vendor owned UEFI real-time services. Once done, BMC 203 sends an ACPI GPE (General Processing Event) to inform ACPI OEM driver 208 that an ACPI event has occurred. Such events may be typically implemented as System Control Interrupts (SCIs) and handled by ACPI ACPI OEM driver 208.

Then, at block 307, ACPI sub-system 207 in OS 201, upon receiving an SCI, routes it to the ACPI OEM driver 208. In turn, ACPI OEM driver 208 reads the list of GUIDs from the operating region of BMC 203 and then invokes one by one within the OS context. After execution, ACPI OEM driver 208 clears the GUIDs from the operating region of BMC 203 in preparations for a subsequent set of operations. In some case, although run-time service invocation occurs within the operating system context, the processing can be offloaded to BMC using the Intelligent Platform Management Interface (IPMI) or the like.

In some implementations, when an upgrade of BMC firmware 209 occurs, BMC 203 may send a special GPE to indicate the same. Upon receiving this GPE, ACPI OEM driver 208 of OS 201 waits until the upgrade is complete and resumes operations when BMC 203 is ready. During the upgrade, new ACPI tables may be introduced without a reboot of OS 201.

In situations where registering new UEFI realtime services introduced by platform firmware would require a server reboot, ASL (ACPI Source Language) code operators/methods may instead be implemented in BMC firmware 209 to enable it to perform systems management operations. For example, ASL operators and control methods may be implemented in firmware to gather PCIe inventory. The inventory can be shared with BMC 203 using a pre-defined common operating region. To handle hot-plug scenarios, PCIe inventory may be initiated by the firmware as desired by sending a GPE.

As such, the various systems and methods described herein may address large scale staging including Digital Cross-Connect System (DCS) platforms. By extending ACPI and UEFI capabilities, the systems and methods fit into otherwise existing ACPI and UEFI architectures and hence can be implemented by BIOS/UEFI and BMC vendors. Further, the impact on runtime execution within the OS is minimal since the majority of the processing may be performed by the BMC using the Generic ACPI event handling event, instead of costlier SMI interrupts. Also, there are no in-band agents required in OS to handle these events.

Among many other features, the systems and methods described herein provide the ability to retain full set of BMC management features (inventory and configuration at runtime) on Data Center Solution (DCS) platforms that do not have RT-CEM capable hardware. These systems and methods may also scale to existing DCS customers. On certain BMCs, these systems and methods may provide the ability to implement various management features that are not feasible over $i^2c$ on existing hardware (e.g., firmware update using PCIe transport). In many cases, no hardware modifications are required on existing PCIe cards or servers to support sideband management. Also, the systems and methods described herein may provide the ability to extend this solution for currently shipping IHS platforms. In various situations, these systems and methods may enable faster boot of servers by moving pre-OS management features such as Collect System Inventory On Restart (CSIOR) when implemented as a UEFI runtime service.

In the above described flowcharts, one or more of the methods may be embodied in a memory device or computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by a person of ordinary skill in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
a processor; and
a physical memory coupled to the processor, the memory having program instructions stored thereon that, upon execution by the processor, cause the IHS to:
(a) during the booting of an Operating System (OS) and under control of an Unified Extensible Firmware Interface (UEFI) firmware:
create an Original Equipment Manufacturer (OEM) runtime-defined table configured to store a list of Globally Unique Identifiers (GUIDs) associated with OEM devices coupled to the IHS, wherein each OEM device corresponds to an OEM vendor-owned UEFI real-time service, and wherein each OEM vendor-owned UEFI real-time service is configured to enable operations with respect to a corresponding one of the OEM devices after the booting of the OS; and
load an Advanced Configuration and Power Interface (ACPI) OEM driver configured to interpret the OEM runtime-defined table and to invoke one or more corresponding OEM vendor-owned UEFI runtime services, and inform a Baseboard Management Controller (BMC) coupled to the processor that the ACPI OEM driver is available;

(b) after the booting of the OS, use contents of the OEM runtime-defined table to perform, via the BMC, at least one of the operations upon at least one of the OEM devices; and (c) determine that a Configuration Enablement Management (CEM)-capable device among the OEM devices is unable to perform or submit to one or more inventory or management operations due to one or more errors; and (d) add the CEM-capable device to the OEM runtime-defined table.

2. The IHS of claim 1, wherein one or more of the OEM devices are not real-time Configuration Enablement Management (CEM) capable.

3. The IHS of claim 2, wherein the program instructions, upon execution by the processor, further cause the IHS to populate the OEM runtime-defined table under control of the BMC.

4. The IHS of claim 3, wherein the program instructions, upon execution by the processor, further cause the IHS to generate, in response to the BMC's completion of the population operation, an ACPI General Processing Event (GPE) configured to inform the ACPI OEM driver that an ACPI event has occurred.

5. The IHS of claim 4, wherein the ACPI GPE is a System Control Interrupt (SCI).

6. The IHS of claim 5, wherein the program instructions, upon execution by the processor, further cause the IHS to:
read, by the OS in response to receiving the SCI, each given GUID in the OEM runtime-defined table and invoke corresponding vendor-owned UEFI real-time services; and
clear a list of active GUIDs in preparation for a subsequent set of operations.

7. The IHS of claim 1, wherein the operations include an OEM device inventory operation.

8. The IHS of claim 1, wherein the operations include an OEM device management operation.

9. The IHS of claim 1, wherein the program instructions, upon execution by the processor, further cause the IHS to, prior to the booting of the OS and under control of the UEFI, make one or more ACPI tables available to the OS.

10. The IHS of claim 9, wherein the program instructions, upon execution by the processor, further cause the IHS to, during the booting of the OS and under control of the OS, initialize the one or more ACPI tables using a Root System Description Pointer (RSPD) supplied by the UEFI.

11. The IHS of claim 10, wherein initializing the one or more ACPI tables includes adding definition blocks in a platform vendor namespace.

12. The IHS of claim 1, wherein the program instructions, upon execution by the processor, further cause the IHS to gather OEM device inventory information after booting of the OS and share the OEM device inventory information with the BMC in a pre-defined operating region.

13. In an Information Handling System (IHS) having a processor and a physical memory coupled to the processor, the memory having program instructions stored thereon that, upon execution by the processor, configure the IHS to provide Out-of-Band (OOB) real-time inventory and configuration of Original Equipment Manufacturer (OEM) devices using Advanced Configuration and Power Interface (ACPI) and Unified Extensible Firmware Interface (UEFI) services, a method comprising:

(a) during the booting of an Operating System (OS) and under control of an UEFI firmware:
creating an OEM runtime-defined table configured to store a list of Globally Unique Identifiers (GUIDs) associated with OEM devices coupled to the IHS, wherein each OEM device corresponds to an OEM vendor-owned UEFI real-time service, wherein the OEM devices are not real-time Configuration Enablement Management (CEM) capable, and wherein each OEM vendor-owned UEFI real-time service is configured to enable operations with respect to a corresponding one of the OEM devices after the booting of the OS; and
loading an ACPI OEM driver configured to interpret the OEM runtime-defined table and to invoke one or more corresponding OEM vendor-owned UEFI runtime services, and informing a Baseboard Management Controller (BMC) coupled to the processor that the ACPI OEM driver is available;

(b) after the booting of the OS, using contents of the OEM runtime-defined table to perform, via the BMC, at least one of the operations upon at least one of the OEM devices;

(c) receiving a ACPI General Processing Event (GPE) indicating that the BMC is being upgraded; and (d) updating the OEM runtime-defined table during the upgrade without a reboot of the OS.

14. The method of claim 13, further comprising populating the OEM runtime-defined table under control of the BMC.

15. The method of claim 14, further comprising generating, in response to the BMC's completion of the population operation, another ACPI GPE configured to inform the ACPI OEM driver that an ACPI event has occurred.

16. The method of claim 15, wherein the ACPI GPE is a System Control Interrupt (SCI).

17. The method of claim 16, further comprising reading, by the OS in response to receiving the SCI, each given GUID in the OEM runtime-defined table and invoking corresponding vendor-owned UEFI real-time services.

18. A physical memory device having program instructions stored thereon that, upon execution by a processor of an Information Handling System (IHS), cause the IHS to:

(a) during the booting of an Operating System (OS) and under control of an Unified Extensible Firmware Interface (UEFI) firmware:
create an Original Equipment Manufacturer (OEM) table configured to store a list of Globally Unique Identifiers (GUIDs) associated with OEM devices coupled to the IHS, wherein each OEM device corresponds to an OEM vendor-owned UEFI real-time service, wherein the one or more of the OEM devices are not real-time Configuration Enablement Management (CEM) capable, and wherein each OEM vendor-owned UEFI real-time service is configured to enable operations with respect to a corresponding one of the OEM devices after the booting of the OS; and
load an Advanced Configuration and Power Interface (ACPI) OEM driver configured to interpret the OEM runtime-defined table and to invoke one or more corresponding OEM vendor-owned UEFI runtime services, and inform a Baseboard Management Controller (BMC) coupled to the processor that the ACPI OEM driver is available;

(b) after the booting of the OS, use contents of the OEM table to perform, via the BMC, at least one of the operations upon at least one of the OEM devices;

(c) determine that a Configuration Enablement Management (CEM)-capable device among the OEM devices is unable to perform or submit to one or more inventory or management operations due to one or more errors;

(d) add the CEM-capable device to the OEM table;

(e) receive a ACPI General Processing Event (GPE) indicating that the BMC is being upgraded; and (f) in response to the GPE, update the OEM runtime-defined table during the BMC upgrade without a reboot of the OS.

19. The physical memory device of claim 18, wherein the program instructions, upon execution by the processor, further cause the IHS to populate the OEM runtime-defined table under control of the BMC and to generate another ACPI GPE configured to inform the ACPI OEM driver that an ACPI event has occurred, wherein the ACPI GPE is a System Control Interrupt (SCI).

20. The physical memory device of claim 18, wherein the program instructions, upon execution by the processor, further cause the IHS to read, by the OS in response to receiving the SCI, each given GUID in the OEM runtime-defined table and invoking corresponding vendor-owned UEFI real-time services, wherein the vendor-owned UEFI real-time services include inventory services and management services.

\* \* \* \* \*